No. 741,829. PATENTED OCT. 20, 1903.
J. PRICE.
TUNNEL BORING MACHINERY.
APPLICATION FILED MAR. 30, 1903.
NO MODEL. 5 SHEETS—SHEET 1.

WITNESSES: Randle Holme, Robert Hancock
INVENTOR: John Price

No. 741,829. PATENTED OCT. 20, 1903.
J. PRICE.
TUNNEL BORING MACHINERY.
APPLICATION FILED MAR. 30, 1903.
NO MODEL. 5 SHEETS—SHEET 4.

WITNESSES:
Randle Holme
Robert Hancock

INVENTOR:
John Price

No. 741,829. PATENTED OCT. 20, 1903.
J. PRICE.
TUNNEL BORING MACHINERY.
APPLICATION FILED MAR. 30, 1903.
NO MODEL. 5 SHEETS—SHEET 5.
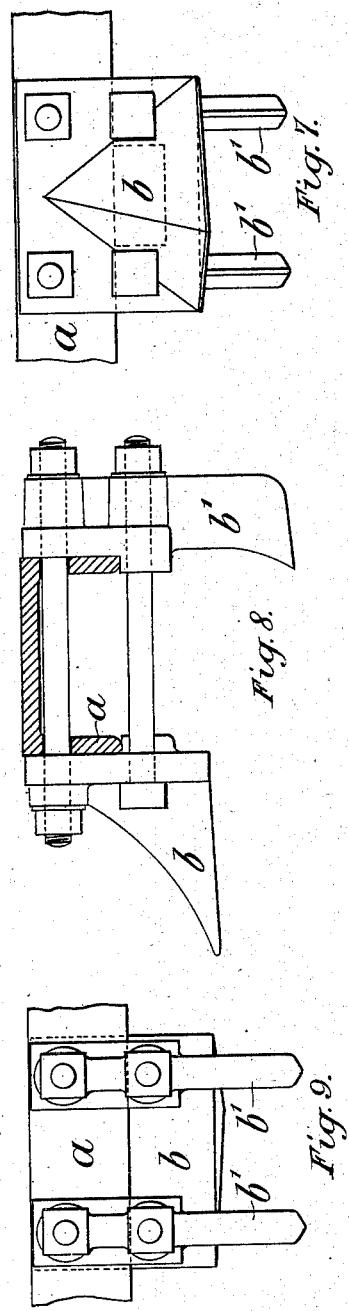
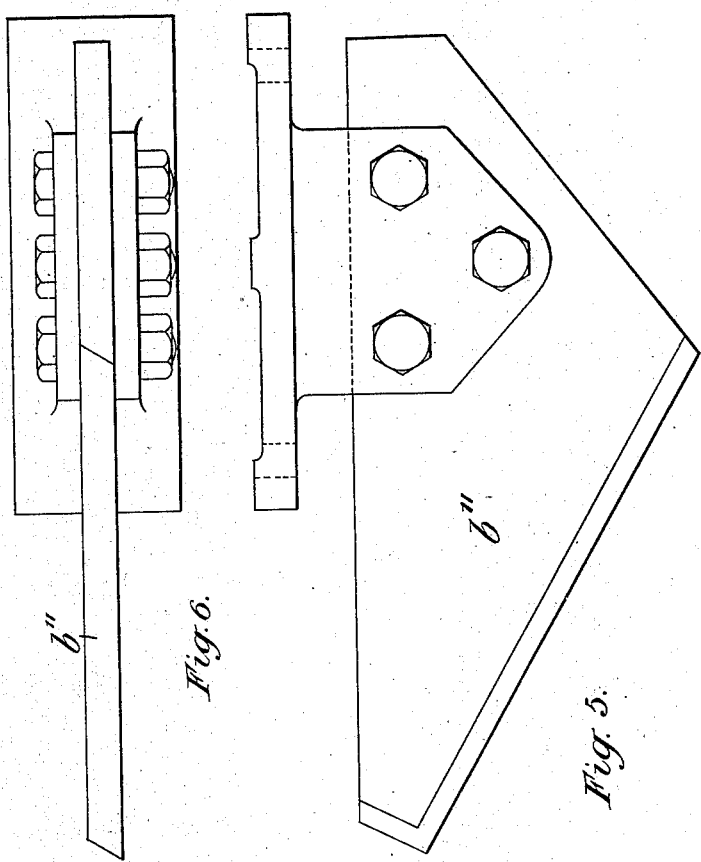
WITNESSES:
Randle Holme
Robert Hancock.
INVENTOR:
John Price No. 741,829. Patented October 20, 1903.

UNITED STATES PATENT OFFICE.

JOHN PRICE, OF WESTMINSTER, ENGLAND.

TUNNEL-BORING MACHINERY.

SPECIFICATION forming part of Letters Patent No. 741,829, dated October 20, 1903.

Application filed March 30, 1903. Serial No. 150,325. (No model.)

*To all whom it may concern:*

Be it known that I, JOHN PRICE, a subject of the King of Great Britain and Ireland, residing at 15 Great George street, in the city of Westminster, England, have invented certain new and useful Improvements in Tunnel-Boring Machinery, of which the following is a specification.

This invention relates to machines for boring tunnels; and it consists in certain improvements in their general arrangement and in details of their construction whereby hand-labor is dispensed with, the work of boring and the removal of the debris being greatly expedited.

Figure 1:
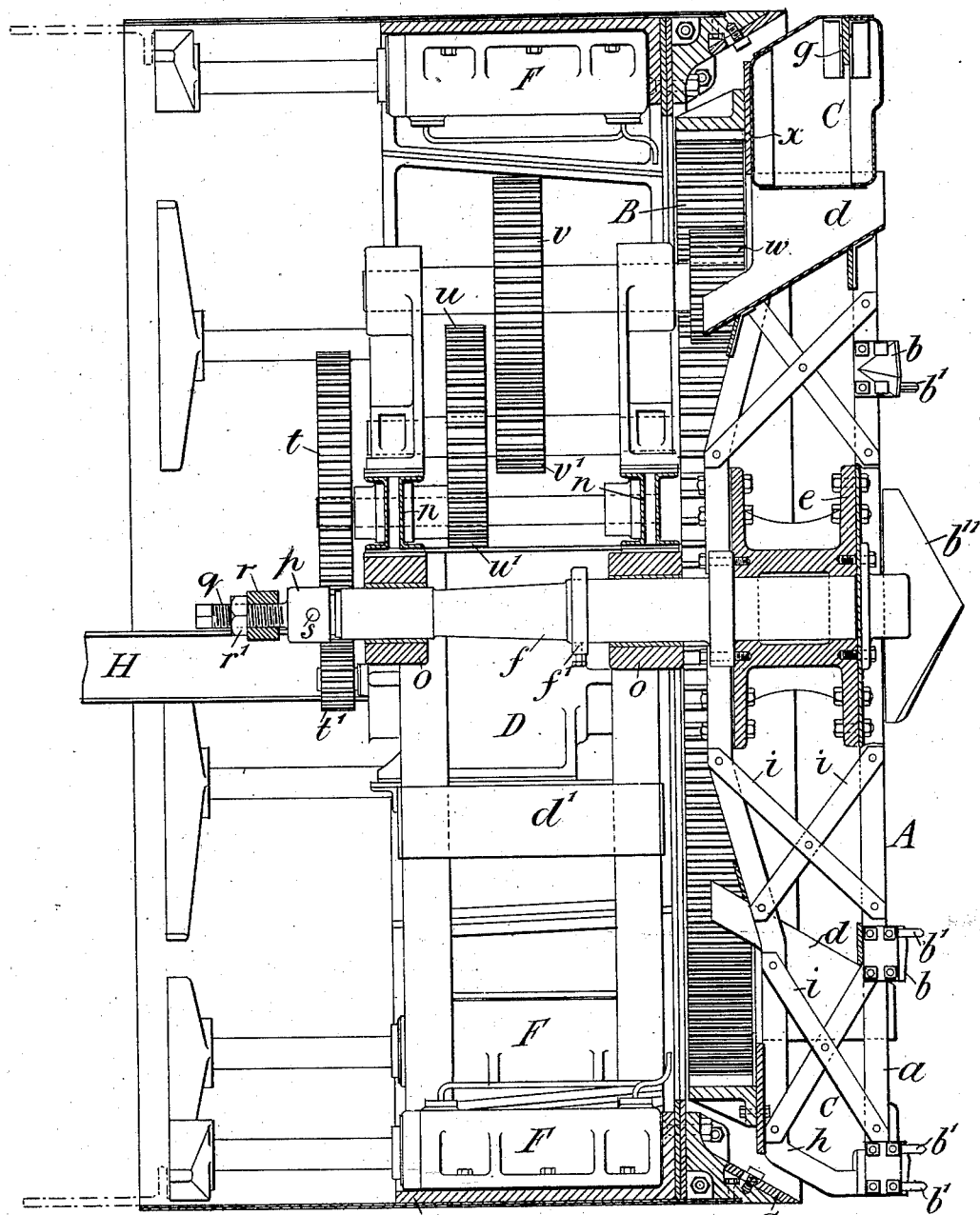
Figure 2:
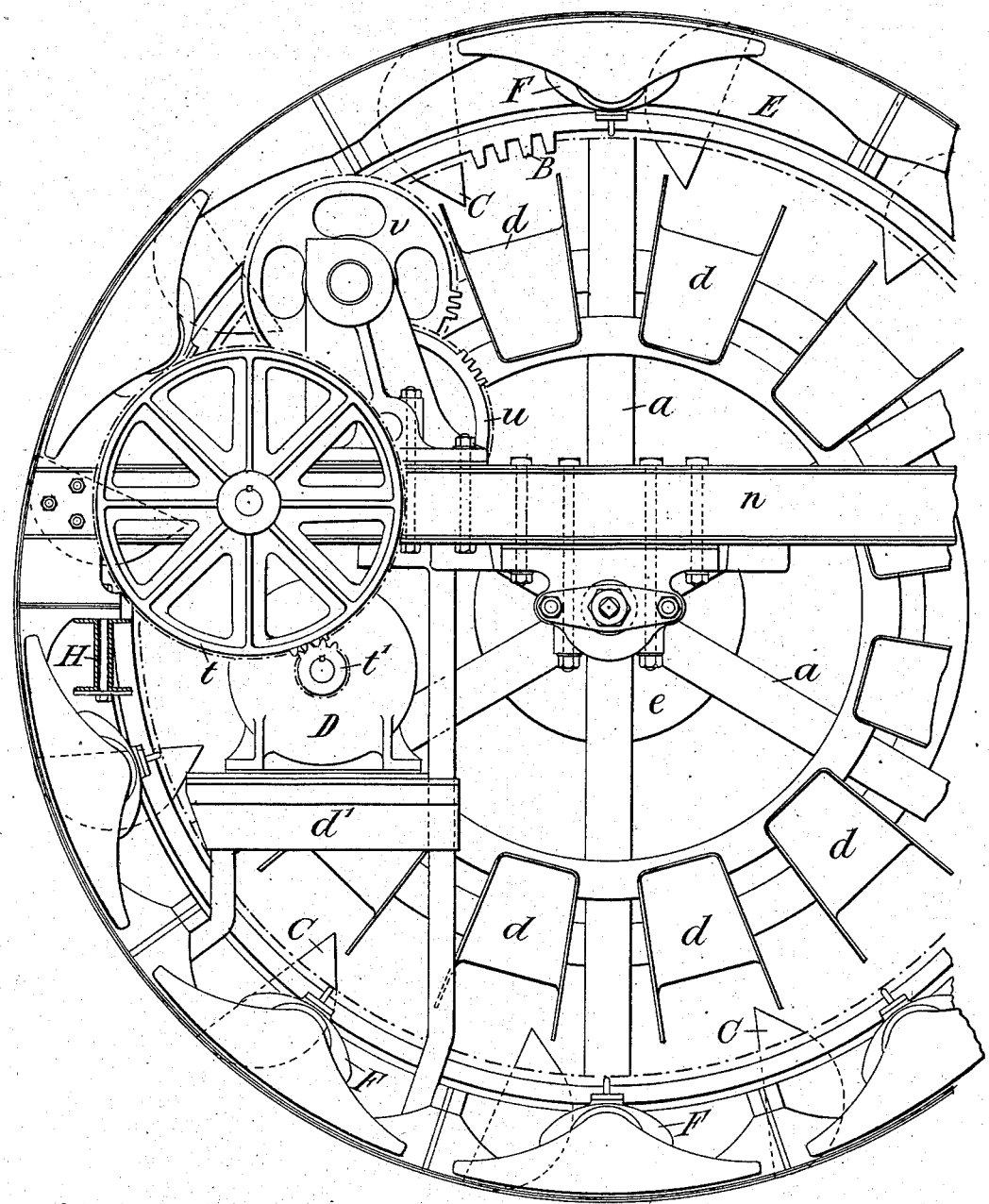
Figure 3:
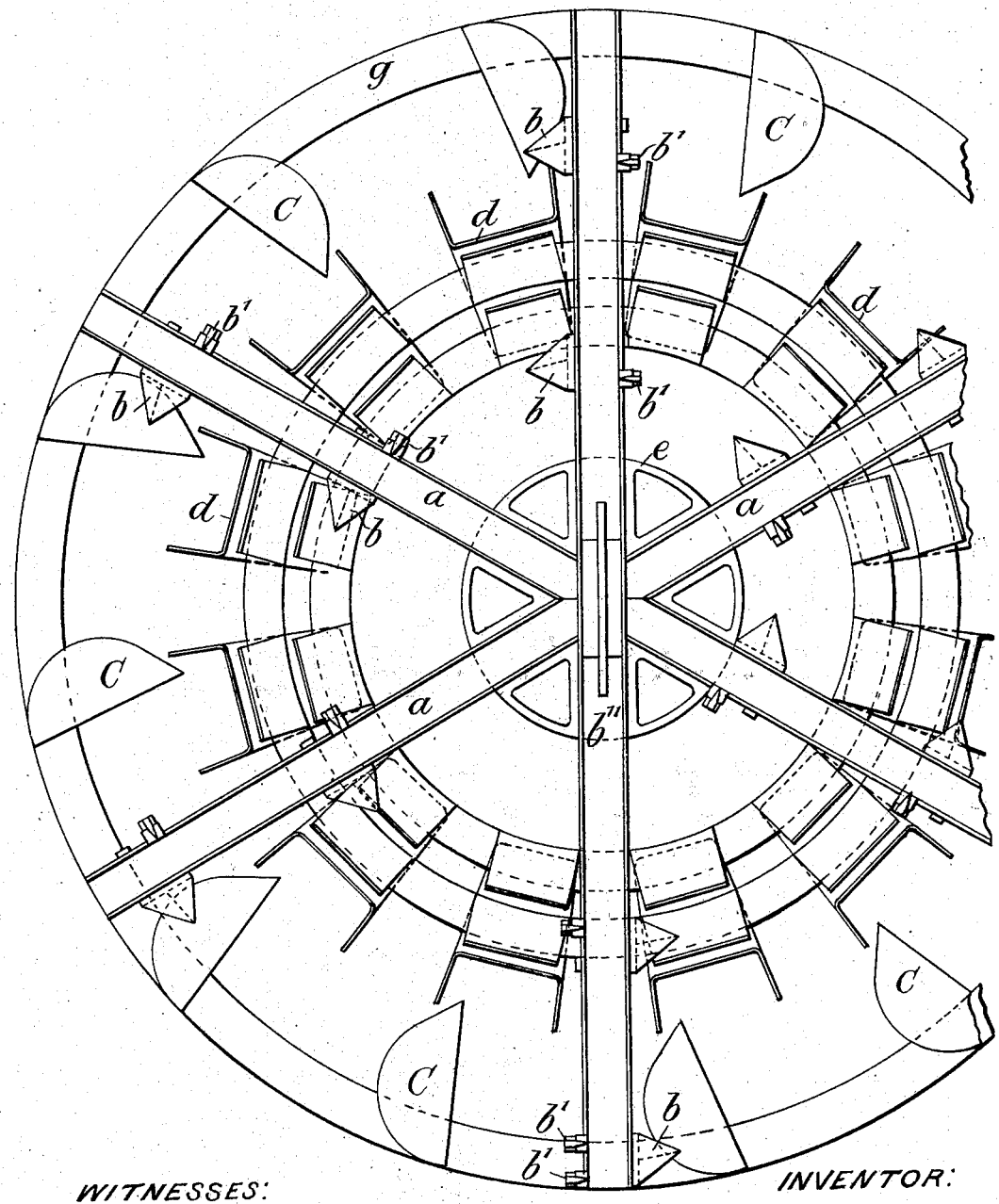
Figure 4:
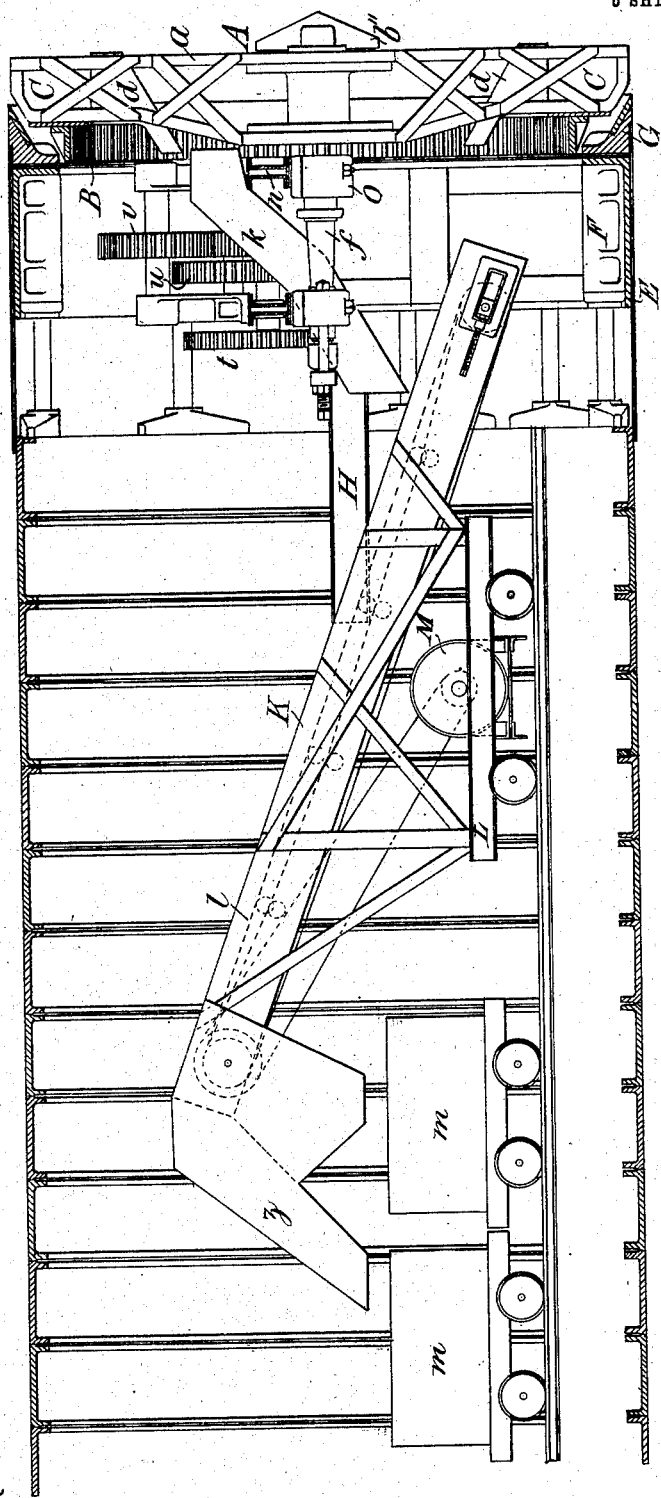

In the accompanying drawings, which represent a tunnel-boring machine embodying my improvements, Figure 1 is a sectional elevation; Fig. 2, a rear view, and Fig. 3 a front view; Fig. 4, an elevation showing the conveyer and trucks in position. Figs. 5, 6, 7, 8, and 9 are detail views of the cutters, hereinafter more particularly described.

The apparatus comprises a cutter-head A, having the tube $e$ fastened to a flange on the shaft $f$ and carrying the inner ends of the radial arms $a$, the outer ends of which are secured to the ring $g$ on the framework $h$, the frame $h$ and arms $a$ being strengthened by stays $i$. Cutters and scrapers $b$ $b'$ are secured by clips in pairs upon the radial arms $a$, the scrapers or plows $b$ being situated so as to precede the corresponding cutters $b'$, and each successive pair is placed nearer the center cutter $b''$. In Figs. 6, 7, and 8 the outer clip is shown, in which two cutters $b'$ are provided, and in Figs. 4 and 5 the center cutter $b''$ is shown secured eccentrically to its bracket. Suitably disposed in relation to the cutters are the buckets or scoops C, which collect the material dislodged and in the course of their rotation with the cutter-head discharge the said material into the chutes $d$, whence it is delivered by way of the chute $k$ to a traveling bed $l$, which conveys it to tip or other suitable skips $m$, and is thus removed.

The cylindrical body portion or shield E, to which the hydraulic cylinders F and the cutting-ring G are secured, is carried on the girders H and is provided with the cross-girders $n$, to which the two bearings $o$ for the support of the cutting-head shaft $f$ are bolted. The hydraulic cylinders serve to advance the cutting-head gradually as the work proceeds. The shaft $f$ is provided with means for lateral adjustment consisting of a thrust-bearing $p$, having a screwed spindle $q$, which works in the bridge $r$, projecting from the bracket $o$, a pin $s$ being inserted in a hole passing through the bearing $p$ and the end of the shaft $f$ when the cutter-head is to be drawn back by turning the bearing $p$, a lock-nut $r'$ and collar $f'$ being provided to secure the shaft $f$ in position.

The mechanism for rotating the cutter-head comprises an electric or other suitable motor D, which, by means of worm or toothed gearing, such as the gear-wheels $t$ $t'$ $u$ $u'$ $v$ $v'$, operates a pinion $w$ for rotating a circular rack B, secured to the ring $x$ on the framework $h$ of the cutter-head A. The motor D is carried by the platform $d'$ and its gearing is mounted on the cross-girders $n$.

The conveyer K, employed for transferring the material from the chute $k$ and delivering it into the skips $m$, is mounted on a carriage L, placed in advance of the skips and arranged to run on the same rails as the latter. These rails being duplicated in order to admit of the tip-trucks $m$ passing one another, the discharge end of the conveyer is furnished with a chute $z$, adapted to deflect the material either to the right or to the left side. The traveling bed $l$ of the conveyer is preferably operated by an independent motor M, mounted upon the conveyer-carriage L.

What I claim as my invention, and desire to secure by Letters Patent, is—

1. In a tunnel-boring machine, the combination, with a cutter-head provided with buckets for collecting, and chutes for carrying off, the cut material, of a circular rack secured to the cutter-head, a pinion in gear with the rack, and, for operating the pinion, a motor mounted in a shield behind the cutter-head, substantially as set forth.

2. In a tunnel-boring machine, the combination with a rotating cutter-head of a conveyer mounted on a carriage running on rails, said conveyer having a traveling bed whereby the material removed is carried to a chute adapted to deflect the same either to the right or to the left, substantially as set forth.

3. In a tunnel-boring machine, a cutter-head provided with buckets C for collecting the cut material and passing it to chutes such as d, substantially as herein described.

4. In a tunnel-boring machine, cutting tools secured by clips to the radial arms of the cutter-head and arranged in such a manner that when rotating the plow $b$ precedes the cutter $b'$, substantially as herein described.

In testimony whereof I have signed my name to this specification in the presence of two subscribing witnesses.

JOHN PRICE.

Witnesses:
RANDLE HOLME,
ROBERT HANCOCK.